(12) United States Patent
Sakai et al.

(10) Patent No.: US 6,963,287 B2
(45) Date of Patent: Nov. 8, 2005

(54) OCCUPANT WEIGHT DETECTING DEVICE

(75) Inventors: Morio Sakai, Toyota (JP); Masaki Mori, Kariya (JP)

(73) Assignee: Aisin Seiki Kabushiki Kaisha, Kariya (JP)

( * ) Notice: Subject to any disclaimer, the term of this patent is extended or adjusted under 35 U.S.C. 154(b) by 146 days.

(21) Appl. No.: 10/446,690

(22) Filed: May 29, 2003

(65) Prior Publication Data

US 2004/0024508 A1  Feb. 5, 2004

(30) Foreign Application Priority Data

May 29, 2002  (JP) .............................. 2002-156171

(51) Int. Cl.[7] .............................................. G08B 21/00
(52) U.S. Cl. ...................................... 340/667; 340/665
(58) Field of Search ............................... 340/667, 665, 340/666; 180/271, 273; 701/45

(56) References Cited

U.S. PATENT DOCUMENTS

| | | | | |
|---|---|---|---|---|
| 5,754,115 A | * | 5/1998 | Woo ............................ | 340/665 |
| 5,801,619 A | * | 9/1998 | Liu et al. ..................... | 340/436 |
| 6,005,485 A | * | 12/1999 | Kursawe et al. ............. | 340/665 |
| 6,685,222 B2 | * | 2/2004 | Winkler et al. .............. | 280/735 |
| 6,694,225 B2 | * | 2/2004 | Aga et al. ....................... | 701/1 |
| 6,774,319 B2 | * | 8/2004 | Aoki et al. ................... | 177/144 |
| 6,774,804 B2 | * | 8/2004 | Sakai et al. .................. | 340/665 |

FOREIGN PATENT DOCUMENTS

JP    2001-239875 A    9/2001

* cited by examiner

Primary Examiner—John Tweel, Jr.
(74) Attorney, Agent, or Firm—Buchanan Ingersoll PC

(57) ABSTRACT

An occupant weight detecting device includes a load detecting device and a control device. The load detecting device detects a load applied to a seat body. The control device detects an occupant sitting on the seat body based on a load detection value detected by the load detecting device. The occupant weight detecting device further includes a power supplying device for supplying power to the load detecting device and a memorizing device for memorizing the load detection value having been detected by the load detecting device. The control device performs primary filter calculation during a predetermined time based on the average of plural load detection values having been memorized to the memorizing device and a current load detection value. The control device performs secondary filter calculation after an elapse of the predetermined time based on one load detection value having been memorized to the memorizing device and the current load detection value.

7 Claims, 7 Drawing Sheets

OCCUPANT WEIGHT DETECTING DEVICE

CROSS REFERENCE TO RELATED APPLICATIONS

The application is based on and claims priority under 35 U.S.C. § 119 with respect to a Japanese Patent Application 2002-156171, filed on May 29, 2002, the entire content of which is incorporated herein by reference.

FIELD OF THE INVENTION

This invention generally relates to an occupant weight detecting device which detects an object ("occupant" or "object") on a seat. More particularly, this invention pertains to filter calculation as a control device outputs a signal in response to a type of the detected object.

BACKGROUND OF THE INVENTION

Recently, in a vehicle, an air bag device, which is one of a safety device, has become a standard equipment in order to ensure safety of an occupant in case of a traffic accident. An impact generated on the vehicle by a collision is detected by a G-sensor. Based on a signal from the G-sensor, an operating signal for operating the air bag device is inputted to the air bag device which is provided in the center of a steering wheel for a driver or a dashboard panel of a passenger seat. When the operating signal is inputted to the air bag device, an inflator accommodated in the air bag device is ignited. By this ignition, gas for inflating the air bag is expanded. Then the air bag is quickly inflated by the gas, and the occupant sitting on a front seat is protected.

For example, a known air bag device is disclosed in a Japanese Patent Laid-Open Publication No. 2001-239875. The air bag device has four load detecting sensors for detecting the weight of an occupant sitting on a seat. Based on output load values detected by the four load detecting sensors, a load detection value is calculated by a CPU. Then the type of occupant sitting on the seat is determined by comparing the load detection value with each predetermined threshold.

However, in the air bag device disclosed in the foregoing publication, the load detection signal or the output load value detected by the load detecting sensor is easily affected by noise. Thus, the influence of the noise on the load detection signal for detecting the occupant sitting on the seat has to be prevented. To prevent the influence of the noise (for example, variation of the load dection signal), a low-pass filter, which performs filter calculation based on a previous load detection signal and a current load detection signal, and a delay circuit for delaying the load detection signal are generally applied.

Particularly, in a control device having a low consumption mode (sleep mode) for reducing power consumption when the occupant on the seat does not need to be detected, when an operation mode is switched from the low consumption mode to a normal operation mode (normal mode), the load detection signal detected by the load detecting sensor is unsteady and can be easily affected by the noise. Further, in the foregoing structure, when the variation of the load detection signal is prevented by the low-pass filter performing the filter calculation based on two detected signals or more (for example, the previous load detection signal and the current load detection signal), as shown in FIG. 8(a), the load detection signal detected by the load detecting sensor gradually increases until the signal reaches a value corresponding to an actual load applied to the seat, and thus rising time of the low-pass filter delays.

When the foregoing control device is applied to the air bag device, it takes time for the load detection signal to reach the value corresponding to the actual load applied to the seat. Thus, the time elapsing until the air bag device operates is delayed because of the time lag associated with the time elapsing until the occupant sitting on the seat is detected, which is not preferable.

The present invention therefore seeks to provide an occupant weight detecting device capable of stably and quickly detecting actual load applied to a seat after an operation mode is switched to a normal mode.

SUMMARY OF THE INVENTION

According to an aspect of the present invention, an occupant weight detecting device includes a load detecting means and a control device. The load detecting means is provided at a seat body and detects a load applied to the seat body. The control device detects an occupant sitting on the seat body based on the load detection value detected by the load detecting means and outputs a signal in response to a type of the occupant. The occupant weight detecting device further includes a power supplying device for supplying power to the load detecting means and a memorizing means for memorizing the load detection value having been detected by the load detecting means. The control device performs primary filter calculation during a predetermined time based on the average of plural load detection values having been memorized to the memorizing means and current load detection value. The control device performs secondary filter calculation after elapse of the predetermined time based on one load detection value having been memorized to the memorizing means and the current load detection value.

According to another aspect of the present invention, the average of the plural load detection values and the current load detection value are given weighting in the primary filter calculation, and the one load detection value and the current load detection value are given weighting in the secondary filter calculation.

According to still another aspect of the present invention, the weighting on the plural load detection values is larger than the weighting on the current load detection value in the primary filter calculation, and the weighting on the one load detection value is larger than the weighting on the current load detection value in the secondary filter calculation.

BRIEF DESCRIPTION OF THE DRAWING FIGURES

The foregoing and additional features and characteristics of the present invention will become more apparent from the following detailed description considered with reference to the accompanying drawing figures wherein.

DETAILED DESCRIPTION OF THE INVENTION

Figure 1:
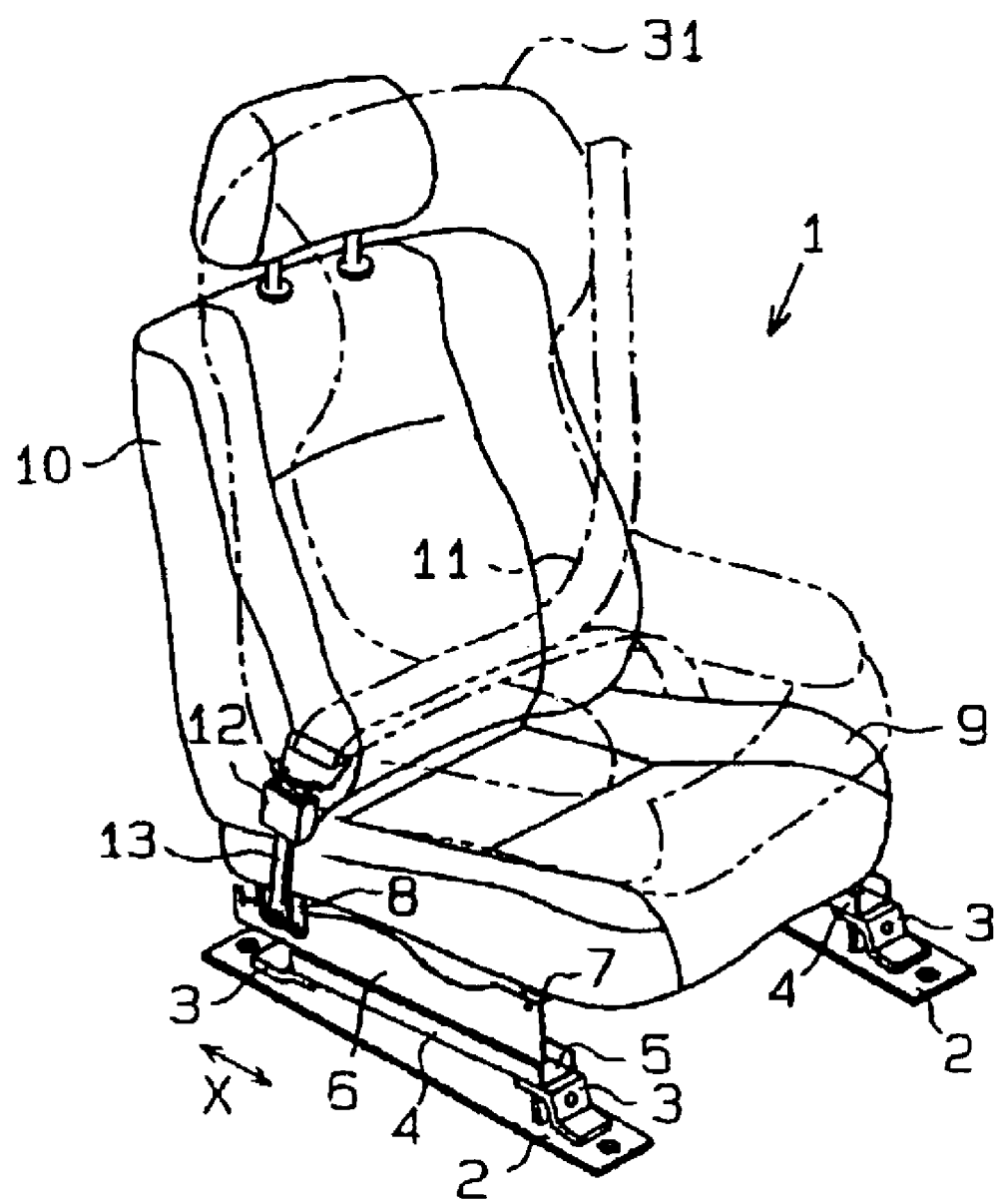
FIG. 1 is perspective view of a seat according to an embodiment of the present invention.

As shown in FIG. 1, a seat body 1 according to an embodiment of the present invention is provided, for example, as a front seat of a vehicle. A pair of supporting frames 2 is fixed to a vehicle floor (not shown) and extends in a longitudinal direction of the vehicle ("X" arrow shown in FIG. 1). The seat body 1 is mounted on the vehicle floor through the pair of supporting frames 2.

A pair of brackets 3 is fixed to each supporting frame 2 on front and rear portions thereof, and a lower rail 4 is fixed to the pair of the brackets 3 along the supporting frame 2. The lower rail 4 has an approximately U-shaped cross section with an upward opening. The opening extending in the longitudinal direction of the vehicle forms a slide groove 5.

Figure 2:
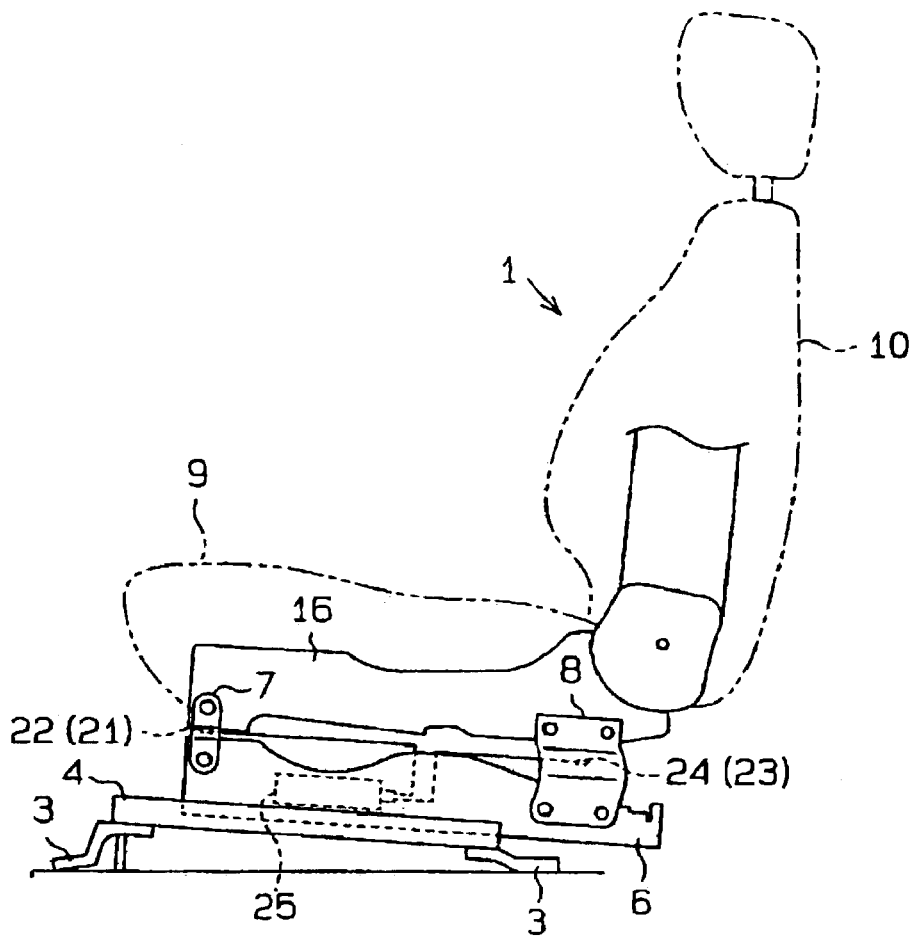
FIG. 2 is a lateral view of the seat shown in FIG. 1.

A pair of upper rails 6 is accommodated in the slide grooves 5 of the lower rails 4 so as to be slidably movable in the longitudinal direction of the vehicle in the slide grooves 5. As shown in FIG. 2, each upper rail 6 has a front sensor bracket 7 and a rear sensor bracket 8. A pair of lower arms 16, which supports a seat cushion 9 and a seat back 10, is connected to the pair of upper rails 6 by using the front sensor brackets 7 and the rear sensor brackets 8.

Figure 3A:
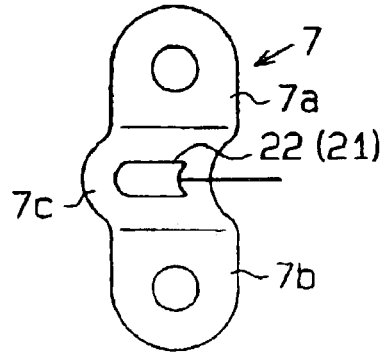
FIG. 3(a) is a perspective view of a front sensor bracket provided on lateral sides of the seat shown in FIG. 1.

As shown in FIG. 3(a), the front sensor bracket 7 of each upper rail 6 is provided with an upper fastening portion 7a and a lower fastening portion 7b. Further, a flexible portion 7c, which is located between the upper fastening portion 7a and the lower fastening portion 7b with being curved, is provided with the front sensor bracket 7. The upper fastening portion 7a and the lower fastening portion 7b are respectively fixed to a front side of the lower arm 16 and a front side of the upper rail 6. The flexible portion 7c of each front sensor bracket 7 is provided with a load detecting sensor, that is a front right-hand side sensor 21 (a load detecting means, hereinafter referred to as a load detecting sensor 21) and a front left-hand side sensor 22 (a load detecting means, hereinafter referred to as a load detecting sensor 22). Generally, a strain detecting element such as a strain gauge is applied to these load detecting sensors 21 and 22. The load detecting sensors 21 and 22 can detect a flexible amount of the flexible portion 7c in response to load applied to the seat cushion 9.

Figure 3B:
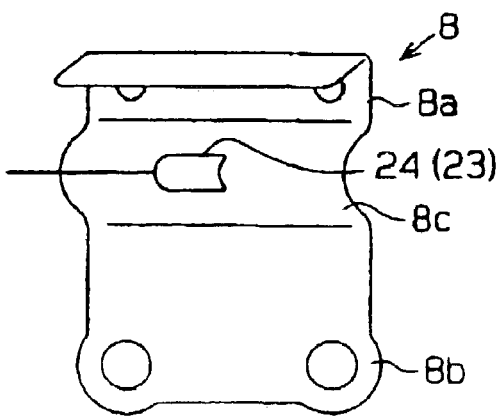
FIG. 3(b) is a perspective view of a rear sensor bracket provided on lateral sides of the seat shown in FIG. 1.

On one hand, as shown in FIG. 3(b), the rear sensor bracket 8 of each upper rail 6 is also provided with an upper fastening portion 8a and a lower fastening portion 8b as same with the front sensor bracket 7. A flexible portion 8c, which is located between the upper fastening portion 8a and the lower fastening portion 8b with being curved, is provided with the rear sensor bracket 8. The upper fastening portion 8a and the lower fastening portion 8b are respectively fixed to a rear side of the lower arm 16 and a rear side of the upper rail 6. The flexible portion 8c of each rear sensor bracket 8 is provided with a load detecting sensor, that is a rear right-hand side sensor 23 (a load detecting means, hereinafter referred to as a load detecting sensor 23) and a rear left-hand side sensor 24 (a load detecting means, hereinafter referred to as a load detecting sensor 24). The strain detecting element such as the strain gauge is applied to these load detecting sensors 23 and 24 as same with the load detecting sensors 21 and 22. The load detecting sensors 23 and 24 can detect a flexible amount of the flexible portion 8c in response to load applied to the seat cushion 9.

As shown in FIG. 1, an anchor bracket 13 is connected to the upper rail 6 at one side of the seat body 1 and has a belt anchor 12. A seat belt 11 provided in the vehicle is connected to the belt anchor 12.

An occupant weight detecting device 20 according to the invention can be applied to an air bag device including an air bag ECU 30 (hereinafter referred to as an A/B ECU 30) and an air bag inflating device 32. The air bag inflating device 32, which is controlled by the AB ECU 30, is provided, for example, in the center of a steering wheel for a driver or a dashboard panel of a passenger seat. The air bag inflating device 32 inflates an air bag (not shown) in case of a collision. An inflating amount of the air bag is controlled by the A/B ECU 30 in response to a type of an occupant ("adult", "child" or "CRS"). The type of the occupant has been predetermined by the occupant weight detecting device 20. The foregoing system structure including the air bag device is explained below with reference to FIG. 4.

Figure 4:
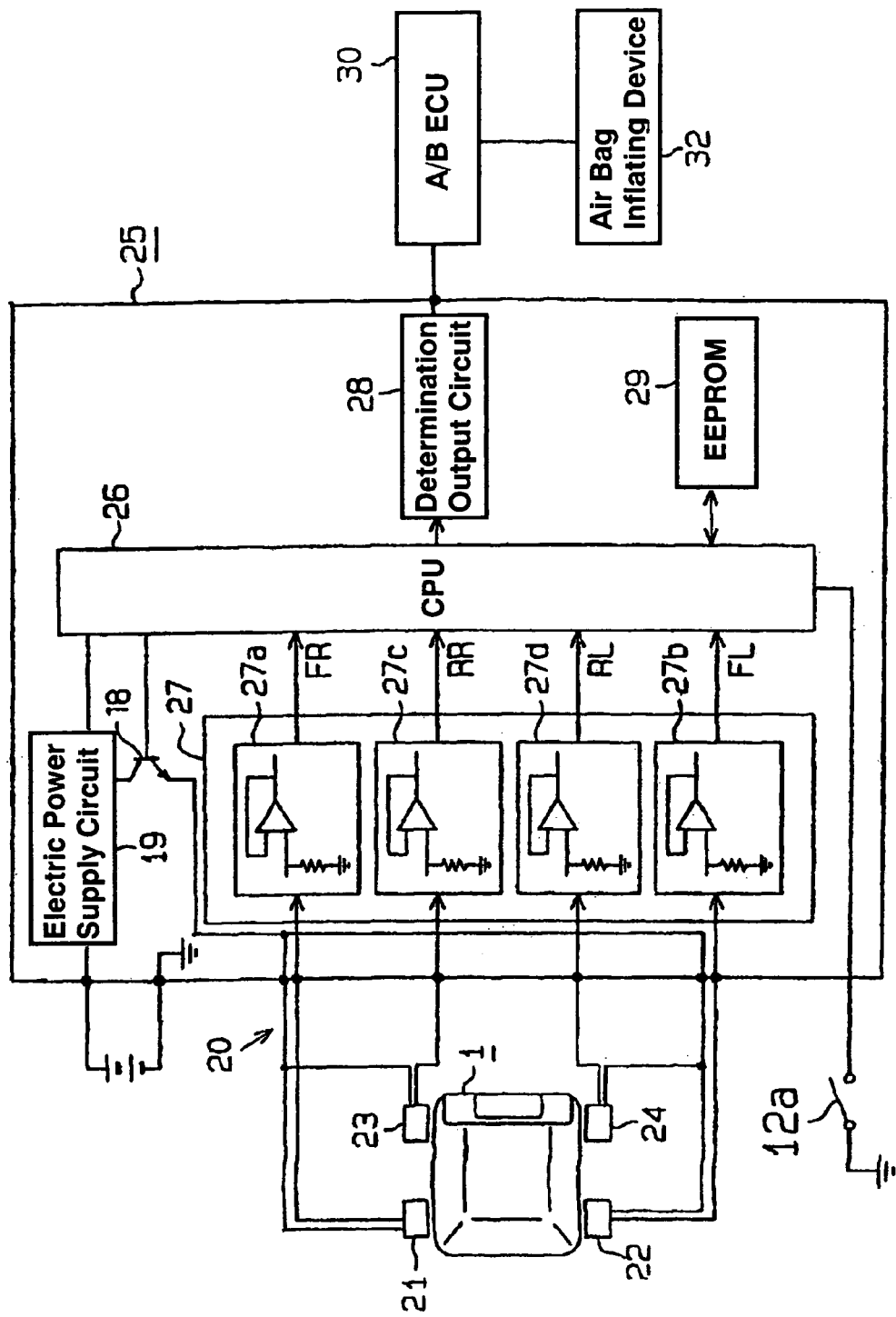
FIG. 4 is a system diagram of an occupant weight detecting device applied to an air bag device according to the embodiment of the present invention.

As shown in FIG. 4, the system has the load detecting sensors 21–24 provided at a predetermined position of the seat body 1 and a seat belt switch 12a provided at the belt anchor 12. Further, the system has a controller 25 which transmits an operating command to the A/B ECU 30 in response to the type of the occupant sitting on the seat body 1.

The seat belt switch 12a is turned on by connecting the seat belt 11 to the belt anchor 12 and otherwise, turned off. A detection signal from the seat belt switch 12a is inputted to the controller 25. The controller 25 (a control device) can detect the connecting state of the seat belt 11 based on the detection signal.

The controller 25 has CPU 26, an electric power supply circuit 19 for supplying predetermined power (for example, Vcc=5V), a sensor signal input circuit 27, and a determination output circuit 28 therein. The controller 25 further has a switching element 18 (a power supplying device) and a non-volatile memory (EEPROM) 29 (hereinafter referred to as a memory 29) therein. The switching element 18 supplies or shuts off the power to the load detecting sensors 21–24 based on a command from the CPU 26, and the memory 29 (a memorizing means) can hold a memorized state even if the power is not supplied to the controller 25.

The sensor signal input circuit 27 has active filters 27a, 27b, 27c, and 27d. Load signals (a load detection value) detected by the load detecting sensors 21–24 are inputted to the active filters 27a–27d respectively. The load signals are inputted to the CPU 26 through the active filters 27a–27d. The active filters 27a–27d, which includes passive elements such as condensers and resistances combined with active elements such as an amplifier, are well-known filters. With reference to the load signals detected by the load detecting sensors 21–24, only the load signals with lower frequency can pass through the active filters 27a–27d.

Based on the load signals from the load detecting sensors 21 and 22 passing through the active filters 27a and 27b, load detection value FR of the load detecting sensor 21 and load detection value FL of the load detecting sensor 22 are calculated by the CPU 26. Correspondingly, load detection value RR of the load detecting sensor 23 and load detection value RL of the load detecting sensor 24 are calculated by the CPU based on the load signals from the load detecting sensors 23 and 24 passing through the active filters 27c and 27d. A total load detection value (hereinafter referred to as a total load "S") as the load detection value is calculated by the sum of the load detection values FR, FL, RR, and RL.

The CPU 26 performs the calculation based on a predetermined program memorized therein, and the calculation result is inputted to the determination output circuit 28. Then, a driving signal for inflating the air bag is transmitted to the A/B ECU 30. The inflating amount of the air bag is controlled by the A/B ECU 30 in response to the type of the occupant sitting on the seat body 1.

In the occupant weight detecting device 20, a child restraint system 31 (hereinafter referred to as a CRS 31), which is called "child seat", can be mounted to the seat body 1 in order to protect a child in case of a collision. The CRS 31 is generally mounted to the seat body 1 by using the seat belt 11 as shown in FIG. 1 with a double-dashed line. When the CRS 31 is mounted to the seat body 1, the following operation is needed.

More specifically, when the CRS 31 is mounted on a sitting part formed by the seat cushion 9 and the seat back 10, the CRS 31 is initially set on the seat cushion 9. Since the CRS 31 weighs several kilograms, which is lighter than weight of the adult, the total load "S" is relatively small value compared to the total load "S" corresponding to the adult. Next, the seat belt 11 is put through a mounting hole provided with the back of the CRS 31, the seat belt 11 is connected to the belt anchor 12, then the CRS 31 is temporarily fixed. In this case, since the CRS 31 is not fixed tightly to the seat body 1 by the seat belt 11, the total load "S" is relatively small value. When the child sits on the seat body 1, the foregoing state similarly appears.

After that, in order to fix the CRS 31 firmly to the seat body 1, the seat belt 11 is fastened with the CRS 31 being pressed tightly to the seat body 1. In the foregoing mounting process of the CRS 31, the total load "S" significantly varies. Consequently, the mounting of the CRS 31 can be recognized by detecting variation of load or variation of the total load "S" in a series of the mounting process.

Next, a series of transaction performed by the CPU 26 included in the controller 25 is explained below with reference to a flow chart shown in FIG. 5. In the following explanation, "step" at each transaction is referred to as "S".

Figure 5:
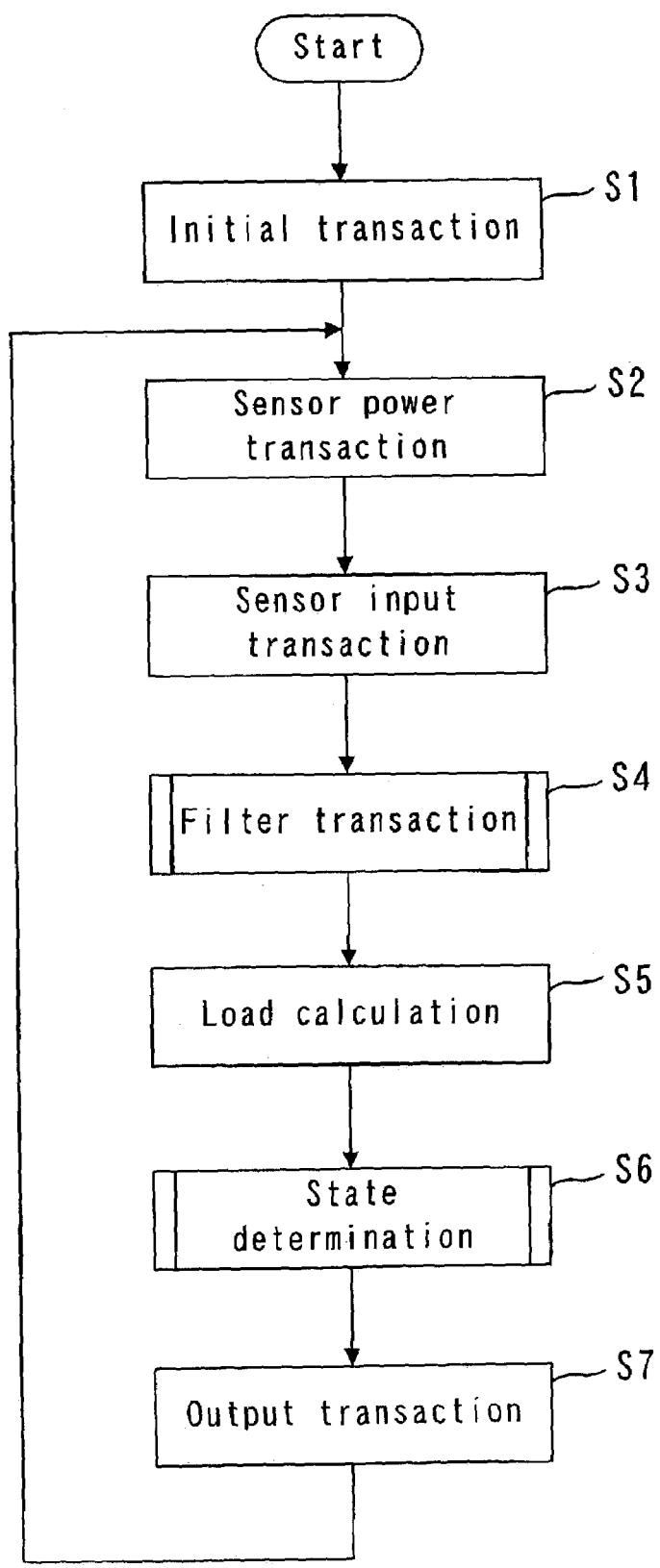
FIG. 5 is a flow chart describing a series of the transaction of CPU shown in FIG. 4.

When the power is initially supplied to the CPU 26 from a battery, or when the CPU 26 is reset, a program shown in FIG. 5 performs the transaction from S1. In initial transaction at S1, the CPU 26 checks whether or not an inside memory can normally memorize an inputted data. Then the CPU 26 sets an initial value to the memory 29. The initial value is needed in order to perform the transaction subsequently. Further, in the initial transaction, the CPU 26 checks whether or not the the controller 25 and the air bag device including the A/B ECU 30 can normally operate.

After that, at the sensor power transaction at S2, when the CPU 26 supplies high voltage to a base of the switching element 18, predetermined voltage Vcc is supplied to the load detecting sensors 21–24, then load detection values are outputted from the load detecting sensors 21–24. On one hand, when low voltage is supplied to the base of the switching element 18, the power is not supplied to the load detecting sensors 21–24. As the CPU 26, CPU, which is capable of switching from a normal operation mode (a normal mode) to a low consumption mode (a sleep mode) for reducing power consumption when load detection by the load detecting sensors 21–24 is not performed or when the load detection need not to be performed, can be applied. When the CPU 26 capable of switching from the normal mode to the sleep mode is applied, the structure for supplying the power can be set up so that the power can be supplied to the load detecting sensors 21–24 in case of the switching from the sleep mode to the normal mode The power is supplied to the load detecting sensors 21–24, the CPU 26 performs sensor input transaction at S3. At the sensor input transaction, sensor voltage (a load detection signal) detected by the load detecting sensors 21–24 is inputted to the controller 25. After the transaction at S3, filter transaction is performed at S4 A flow chart describing the filter transaction at S4 is shown in FIG. 6.

Figure 6:
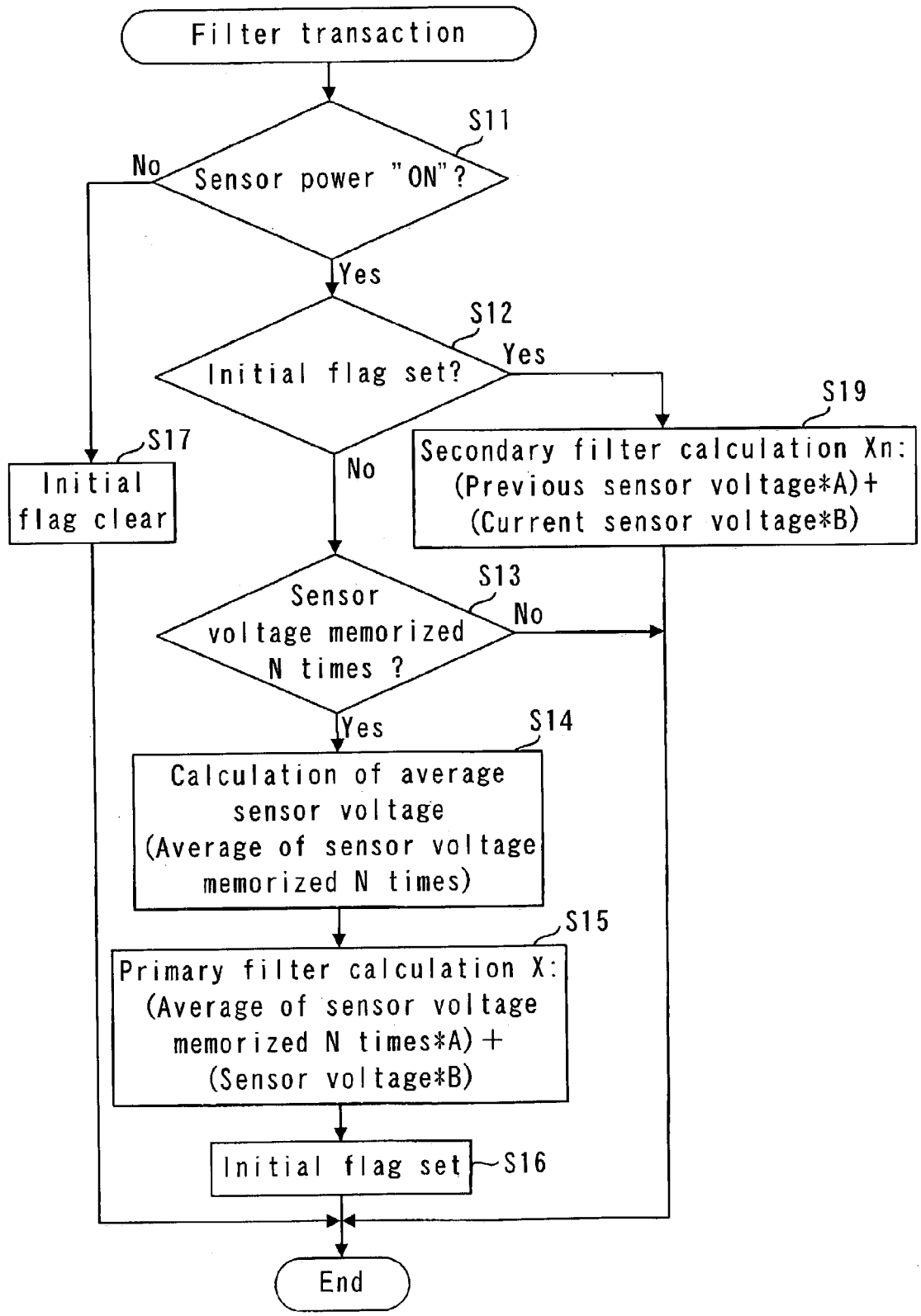
FIG. 6 is a flow chart describing filter transaction shown in FIG. 5.

At the filter transaction shown in FIG. 6, the CPU 26 initially determines whether or not the power with the predetermined voltage Vcc is supplied to the load detecting sensors 21–24 (power is "ON"). If the power is not "ON", an initial flag is cleared at S17, and then the filter transaction is ended. On one hand, if the power is "ON" at S11, the transaction proceeds to next S12. The transaction at S12 determines whether or not the initial flag is set. The initial flag is used for switching filter calculation until sensor output becomes stable after the power is supplied to the load detecting sensors 21–24. At S12, if the initial flag is not set, the transaction proceeds to S13, and then a series of the transaction including primary filter calculation is performed at and after S13. If the initial flag is set, secondary filter calculation at S19 is performed. At the secondary filter calculation, a filter calculation value "Xn" is calculated by the following calculation. The value "Xn" is the sum of previous sensor voltage (proportional to the load detection value) multiplied by a weighting factor A and current sensor voltage (current load detection value) multiplied by a weighting factor B. The previous sensor voltage (one load detection value) is memorized to the memory 29 at the previous sensor input transaction, and the current sensor voltage is detected at the current sensor input transaction. Since the weighting factor A is set so as to be very larger than the weighting factor B, the previous load detection values from the load detecting sensors 21–24, which have been memorized to the memory 29 at the previous sensor input transaction, can be given the weighting. Thus, cut-off frequency at the filter transaction is lowered, and variation of load by noise can be prevented. After this secondary filter calculation is ended, and then the filter transaction is ended.

On one hand, if the initial flag is not set at S12, the transaction at S13 determines whether or not the sensor voltage is memorized "N" times. At this transaction, the sensor voltage is sequentially memorized "N" times to the memory in time series every predetermined cycle after the power is supplied. If the sensor voltage is not memorized N times to the memory, the primary filter calculation is not performed. The sensor voltage is easily affected by the noise during a predetermined time after the power is supplied. Additionally, since the sensor voltage is "zero" or an "indeterminate value" during the predetermined time, the filter calculation, which is different from the calculation performed under the stable sensor voltage, is performed until the sensor voltage becomes stable for the predetermined time. That is, at S14, after the sensor voltage is memorized N times to the memory 29, the average of plural sensor voltage (the average of plural load detection values) is calculated and memorized to the memory 29 as an average sensor voltage. After that, the primary filter calculation is performed at S15. At S15, a filter calculation value "X" is calculated by the following calculation. The value "X" is the sum of the average sensor voltage multiplied by the weighting factor A and the current sensor voltage (current load detection value) multiplied by the weighting factor B. The average sensor voltage is previously calculated at S14. In this case, by setting the weighting factor A very larger than the weighting factor B, the average sensor voltage based on the sensor voltage, which have been previously detected from load detecting sensors 21–24, can be given the weighting as compared to the current sensor voltage. Thus, the variation of the load by the noise can be prevented during the predetermined time after the power is supplied. When the primary filter calculation is ended, the sensor voltage detected by the load detecting sensors 21–24 becomes reliable. After the primary filter calculation at S15, the initial flag, which shows elapse of the predetermined time after the power is supplied, is set at S16, and then this filter transaction is ended.

In a series of the transaction shown in FIG. 5, load calculation at S5 is performed after the filter transaction at S4. At the load calculation at S5, total load "S" is calculated based on the load detection values FR, FL, RR, and RL and then memorized to the memory 29. After that, state determination is performed at S6, then the CPU 26 outputs the driving signal to the A/B ECU 30 at S7 with the inflating amount of the air bag being controlled based on the state determined at S6. A series of the foregoing transaction from S2 to S7 is repeated with a predetermined cycle.

Figure 7:
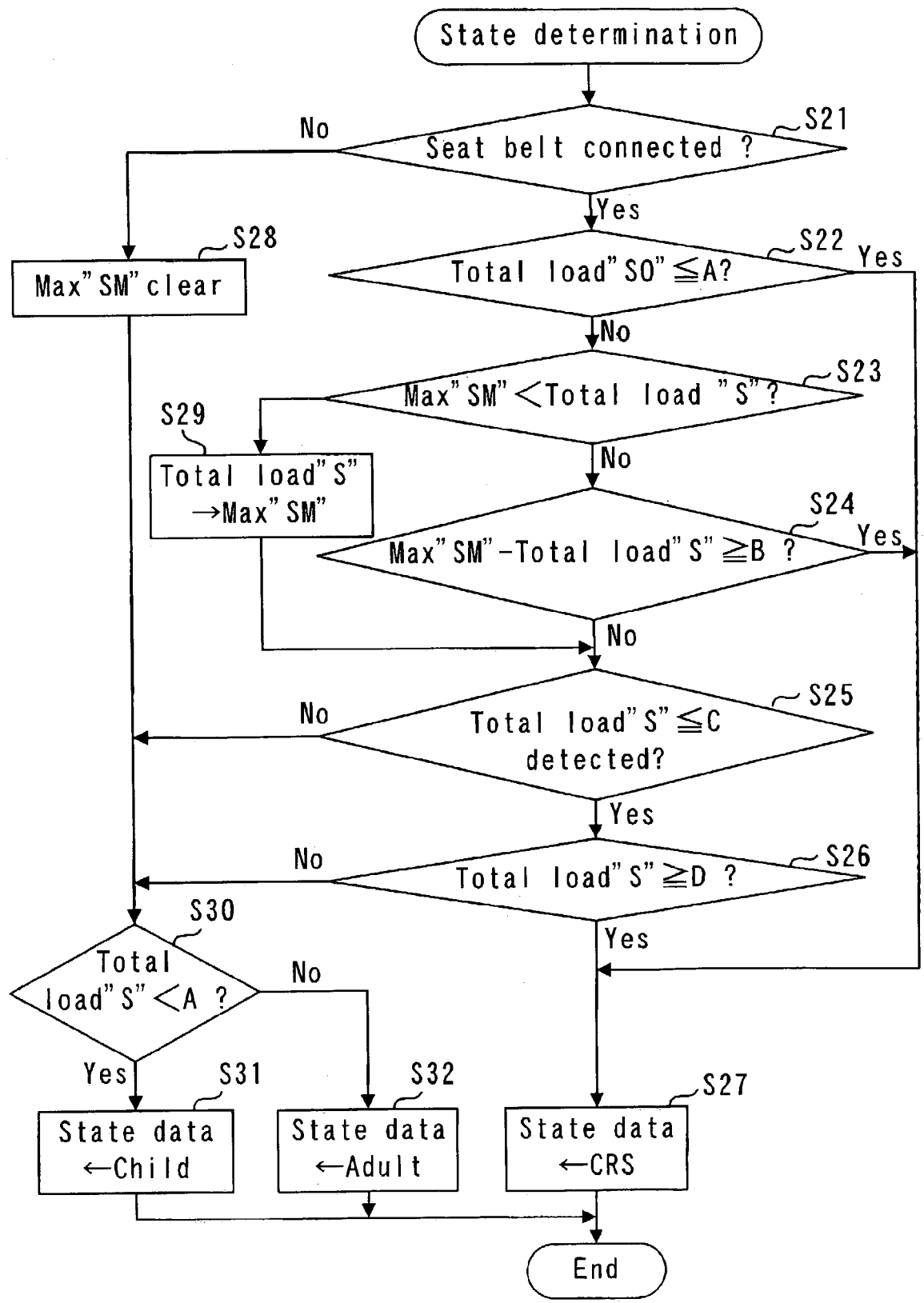
FIG. 7 is a flow chart describing state determination shown in FIG. 5.

Next, the state determination at S6 shown in FIG. 5 is explained below with reference to FIG. 7. This state determination at S6 initially determines whether or not the seat belt 11 is connected to the belt anchor 12 mounted in the seat body 1. When the seat belt switch 12a is "ON", the CPU 26 determines that the seat belt 11 is connected to the belt anchor 12. If the seat belt switch 12a is "OFF", the CPU 26 determines that the seat belt 11 is not connected to the belt anchor 12.

When the seat belt 11 is connected to the belt anchor 12, a series of the transaction, which classifies the state base on the total load "S" or variation of the total load "S" of the load detecting sensors 21–24, is performed at and after S22. The transaction at S22 determines whether or not the total load "S0" as the seat belt 11 is connected is a predetermined value "A" or less. The total load "S0" corresponds to the total load "S" as the seat belt switch 12a is switched from "OFF" to "ON". The total load "S0" is memorized to the memory 29 so that the memorized state can be held when the power is not supplied to the controller 25.

That is, when an adult sits on the seat body 1, the load corresponding to the adult is applied to the seat cushion 9, thus the total load "S0" as the seat belt 11 is connected is relatively large value.

On one hand, when a child sits on the seat body 1 or the CRS 31 is temporarily fixed to the seat body 1, the total load "S0" as the seat belt 11 is connected is relatively small value since the total load "S" corresponding to the child or the CRS 31 is small as compared to the adult. Thus, the predetermined value "A" is set to be a value classifying whether or not the adult sits on the seat body 1 based on the total load "S0" as the seat belt 11 is connected.

At S22, when the total load "S0" is the predetermined value "A" or less, the transaction proceeds to S27. In the transaction at S27, the CPU 26 determines that the CRS 31 is mounted, then state data "1", which shows determination of the CRS 31, is memorized to the inside memory. After that, the state determination is ended.

On one hand, at S22, the total load "S0" is larger than the predetermined value "A", the transaction proceeds to S23. This time, the transaction determines whether or not current maximum value "SM" of the total load "S" is smaller than the total load "S". The maximum value "SM" is the maximum value of the total load "S" detected after the seat belt 11 is connected. That is, if the maximum value "SM" is smaller than the total load "S" the CPU 26 determines that the total load "S" increases as compared to the total load "S" calculated at the previous calculation (a previous cycle), and then the transaction proceeds to S29. At S29, after the maximum value "SM" is updated to the total load "S" calculated at a current cycle, the transaction proceeds to S25.

At S23, the maximum value "SM" is the total load "S" or more, the maximum value "SM" is not updated to the total load "S", and then the transaction proceeds to S24. Then, at S24, the transaction determines whether or not the difference between the maximum value "SM" and the total load "S" is a predetermined value "B" or more. The predetermined value "B" is set to be a value detecting lowering variation of the total load "S" by release of pressing the CRS 31 to the seat body 1 after pressing the CRS 31 to the seat body 1 with the seat belt 11 being fastened. If the difference between the maximum value "SM" and the total load "S" is the predetermined value "B" or more, the CPU 26 determines that significant lowering variation, which is generated by the release of pressing the CRS 31 to the seat body 1 after pressing the CRS 31 to the seat body 1 with the seat belt 11 being fastened, has been detected, then the transaction proceeds to S27. At S27, state data "4: CRS", which shows mounting of the CRS 31, is memorized to the memory 29, then this transaction is ended.

On one hand, at S24, if the difference between the maximum value "SM" and the total load "S" is smaller than the predetermined value "B", the CPU 26 determines that pressing the CRS 31 to the seat body 1 is not performed at the mounting of the CRS 31, and then the transaction proceeds to S25. The transaction at the S25 determines whether or not the total load "S" being a predetermined value "C" or less has been detected until the current calculation. This transaction determines whether or not a relatively small load by the CRS 31 temporarily fixed to the seat body 1 has been detected. The predetermined value "C" is set to be a value at least classifying whether or not the adult sits on the seat body 1.

At S25, if the CPU 26 determines that the total load "S" being the predetermined value "C" or less has been detected until the current calculation, the transaction proceeds to S26. At S26, the transaction determines whether or not the total load "S" is a predetermined value "D" or more. The predetermined value "D" is set to be a value detecting whether or not the CPU 26 has detected increase variation of the total load "S" by pressing the CRS 31 to the seat body 1 in case of fastening the seat belt 11. Additionally, the predetermined value "D" is set to be larger than the predetermined value "C". At S26, if the total load "S" is the predetermined value "D" or more, the CPU 26 determines that the increase variation of the total load "S", which is generated by fastening the seat belt 11 after temporarily fixing the CRS 31 to the seat body 1, has been detected, and then the transaction proceeds to S27. At S27, state data "4: CRS", which shows the mounting of the CRS 31, is memorized to the memory 29, and then this transaction is ended.

On one hand, at S21, if the seat belt 11 is not connected to the belt anchor 12, the transaction proceeds to S28. The maximum value "SM", which is a standard of the total load "S" having been observed while the seat belt 11 is connected to the belt anchor 12, is cleared at S28, then the transaction proceeds to S30.

Additionally, at S25, if the CPU 26 determines that the total load "S" being larger than the predetermined value "C" has been detected until the current calculation, or at 26, if the CPU 26 determines that the total load "S" having been detected at the current calculation is smaller than the predetermined value "D", the CPU 26 determines that at least the CRS 31 is not mounted, then the transaction proceeds to S30.

The transaction at S30 determines whether the occupant sitting on the seat body 1 is the adult or the child. For example, at S30, a type of the occupant ("adult" or "child") is classified by determining whether or not the total load "S" is the predetermined value "A" or more. At S30, if the total load "S" is the predetermined value "A" or more, the occupant sitting on the seat body 1 is determined as the "adult", then the transaction proceeds to S32. After state data "3: Adult" is memorized to the memory 29, then this transaction is ended. On one hand, if the total load "S" is smaller than the predetermined value "A", the occupant sitting on the seat body 1 is determined as the "child", and then the transaction proceeds to S31. After state data showing "Child" is memorized to the memory 29, then this transaction is ended.

In addition, when the seat belt 11 is connected to the belt anchor 12, at the transaction (S27, S31, or S32), the CPU 26 can determine the type of the occupant ("adult", "child", or "CRS") based on the total load "S" having been detected by the load detecting sensors 21–24 or the variation of the total load "S". The CPU 26 outputs the driving signal to the A/B ECU 30 through the output determination circuit 28 based on the type of the occupant, then the air bag device can operate based on the type of the occupant.

Figure 8A:
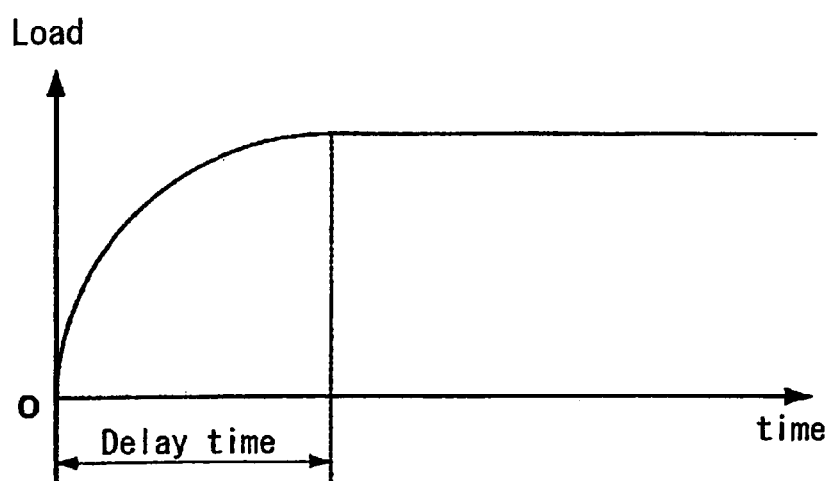
FIG. 8(a) is a graph describing variation of load detection value at initial rise in case of low-pass filter with conventional filter calculation.
Figure 8B:
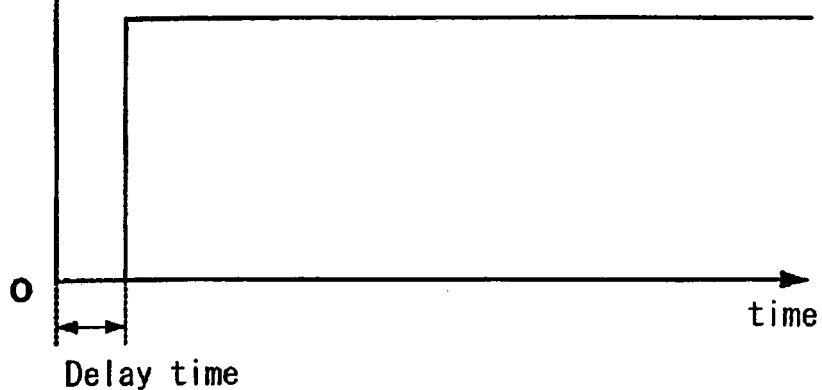
FIG. 8(b) is a graph describing variation of load detection value at initial rise in case of low-pass filter with filter calculation according to the embodiment of the present invention.

As explained above, in the embodiment, by calculating the average of the sensor voltage based on the sensor voltage having been memorized sequentially to the memory 29 at the previous calculation cycle during the predetermined time after the power is supplied, influence of the noise can be prevented during the predetermined time after the sensor operation is started. Additionally, the influence of the noise can be prevented during the predetermined time after the sensor operation is started by calculating the sum of the average sensor voltage multiplied by the weighting factor A and the current sensor voltage multiplied by the weighting factor B. After the elapse of the foregoing predetermined time, the filter calculation is switched, then the current sensor voltage and the previous sensor voltage are given the weighting. By this filter calculation, the necessary cut-off frequency can be attained. As shown in FIG. 8(*a*), the load detection value calculated by conventional filter calculation increase gradually and then the variation of the load detection value converges on an actual load detection value. On one hand, when the filter calculation is switched from the primary filter calculation to the secondary filter calculation after the elapse of the predetermined time, as shown in FIG. 8(*b*), in spite of delay generated until the sensor voltage is memorized to the memory 29 N times, the delay is shorter than the variation of the load detection value shown in FIG. 8(*a*). Additionally, if once the predetermined time elapses after the power is supplied, the load detection value quickly converges on the actual load detection value, and then the state determination can be quickly performed. Consequently, the occupant weight detecting device 20 can detect the type of the occupant in a few moments after the power is supplied, and the driving signal for inflating the air bag can be quickly outputted to the A/B ECU 30.

When the load detection value detected by the load detecting sensor converges from zero or the indeterminate value to the actual load detection value for the initial predetermined time after the power is supplied, the load detection value is not stable or easily affected by the noise. According to the present invention, the load detection value can be calculated by the primary filter calculation performed based on the average of the plural load detection values having been memorized to the memory 29 during the initial predetermined time. After that, when the load detection value becomes stable after the elapse of the predetermined time, the load detection value can be calculated by the secondary filter calculation performed based on the previous load detection value having been memorized to the memory 29.

The noise having been included in the load detection value can be prevented by applying the average of the plural load detection values during the predetermined time after the power is supplied. After that, since the load detection value can be calculated based on the previous load detection value and the current load detection value, the load detection value can quickly reach the actual load detection value as compared to the load detection value gradually varied by low-pass filter with conventional filter calculation and the delay circuit, and the occupant sitting on the seat body 1 can be quickly detected.

In the primary filter calculation, when the plural load detection values and the current load detection value are given the weighting, the load detection value does not become the indeterminate value between the average of the plural load detection values and the current load detection value by the weighting, and the stable load detection value can be calculated by adjusting the weighting during the predetermined time after the power is supplied.

Additionally, in the secondary filter calculation, when the previous load detection value and the current load detection value are given the weighting, the load detection value does not become indeterminate value between the previous load detection value and the current load detection value by the weighting, and the stable load detection value can be calculated by adjusting the weighting after the elapse of the predetermined time after the power is supplied.

Further, in at least either of the primary filter calculation and the secondary filter calculation, if the weighting on the average of the plural load detection values or the previous load detection value is larger than the weighting on the current load detection value, the influence of the average of the plural load detection values or the previous load detection value can be enlarged as compared to the influence of the current load detection value, and then the actual load detection value can be quickly detected.

Furthermore, if the occupant weight detecting device 20 is applied to the air bag device inflating the air bag and the occupant weight detecting device 20 outputs the driving signal to the air bag device in response to the type of the occupant determined based on the load detection value calculated by the primary filter calculation or the secondary filter calculation, the air bag device can quickly perform the operation based on the type of the occupant in a few moments. Thus, reliability of the air bag device can be raised, which is preferable.

The principles, preferred embodiments and mode of operation of the present invention have been described in the foregoing specification. However, the invention which is intended to be protected is not to be construed as limited to the particular embodiments disclosed. Further, the embodiments described herein is to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

What we claim is:

1. An occupant weight detecting device, comprising:
a load detecting means provided at a seat body and detecting a load applied to the seat body;
a control device detecting an occupant sitting on the seat body based on a load detection value detected by the load detecting means and outputting a signal in response to a type of the occupant;
a power supplying device for supplying power to the load detecting means; and
a memorizing means for memorizing the load detection value having been detected by the load detecting means, wherein the control device performs primary filter calculation during a predetermined time based on the average of plural load detection values having been memorized to the memorizing means and a current load detection value, and the control device performs a secondary filter calculation after elapse of the predetermined time based on one load detection value having been memorized to the memorizing means and the current load detection value.

2. An occupant weight detecting device, according to claim 1, wherein the average of the plural load detection values and the current load detection value are given weighting in the primary filter calculation.

3. An occupant weight detecting device, according to claim 1, wherein the one load detection value and the current load detection value are given weighting in the secondary filter calculation.

4. An occupant weight detecting device, according to claim 2, wherein the weighting on the plural load detection values is larger than the weighting on the current load detection value in the primary filter calculation.

5. An occupant weight detecting device, according to claim 3, wherein the weighting on the one load detection value is larger than the weighting on the current load detection value in the secondary filter calculation.

6. An occupant weight detecting device, according to claim 4, wherein an air bag device for inflating an air bag is applied to the occupant weight detecting device, and the control device outputs a driving signal to the air bag device in response to load detection value calculated by the primary filter calculation or the secondary filter calculation.

7. An occupant weight detecting device, according to claim 5, wherein an air bag device for inflating an air bag is applied to the occupant weight detecting device, and the control device outputs a driving signal to the air bag device in response to load detection value calculated by the primary filter calculation or the secondary filter calculation.

* * * * *